(12) United States Patent  (10) Patent No.: US 6,731,030 B2
Keidar et al.                (45) Date of Patent:    May 4, 2004

(54) HIGH PERFORMANCE BRIDGE RECTIFIER FOR DIODE-RECTIFIED ALTERNATING CURRENT GENERATOR

(75) Inventors: Zvi Keidar, Neveh Monosson (IL); Eugen Popa, Bucharest (RO); Sorin Dobrinescu, Bucharest (RO); Florian Turtudau, Bucharest (RO)

(73) Assignee: Integral Ro Design Ltd. (PA)

( * ) Notice: Subject to any disclaimer, the term of this patent is extended or adjusted under 35 U.S.C. 154(b) by 0 days.

(21) Appl. No.: 09/944,220

(22) Filed: Aug. 30, 2001

(65) Prior Publication Data

US 2003/0042808 A1 Mar. 6, 2003

(51) Int. Cl.[7] .............................. H02K 11/00; H05K 7/20
(52) U.S. Cl. ....................... 310/68 D; 310/64; 361/704; 363/145
(58) Field of Search ............................... 310/68 D, 64; 363/145, 704

(56) References Cited

U.S. PATENT DOCUMENTS

| | | | | |
|---|---|---|---|---|
| 3,959,676 A | * | 5/1976 | Striker | 310/68 D |
| 4,604,538 A | * | 8/1986 | Merrill et al. | 310/68 D |
| 4,606,000 A | * | 8/1986 | Steele et al. | 363/145 |
| 4,952,829 A | | 8/1990 | Armbruster et al. | |
| 5,043,614 A | * | 8/1991 | Yockey | 310/68 D |
| 5,331,231 A | * | 7/1994 | Koplin et al. | 310/68 D |
| 5,473,208 A | * | 12/1995 | Stihi | 310/68 D |
| 5,646,838 A | * | 7/1997 | Keidar et al. | 363/145 |
| 5,659,212 A | * | 8/1997 | DePetris | 310/68 D |
| 5,712,517 A | * | 1/1998 | Schmidt et al. | 310/45 |
| 5,812,388 A | * | 9/1998 | Keidar et al. | 363/145 |
| 5,883,450 A | * | 3/1999 | Abadia et al. | 310/68 D |
| 6,034,452 A | * | 3/2000 | Nakamura et al. | 310/68 D |
| 6,140,722 A | * | 10/2000 | Ballard et al. | 310/68 D |
| 6,150,741 A | * | 11/2000 | Hayashi et al. | 310/68 D |
| 6,205,024 B1 | * | 3/2001 | Shih et al. | 361/704 |
| 6,252,320 B1 | * | 6/2001 | Ballard et al. | 310/68 D |
| 6,285,100 B1 | * | 9/2001 | Pflueger et al. | 310/68 D |

* cited by examiner

Primary Examiner—Joseph Waks
(74) Attorney, Agent, or Firm—Mayer Brown Rowe & Mawl LLP

(57) ABSTRACT

A bridge rectifier for an alternating current generator having a slip-ring-end, having, without limitation: a first heat sink having a first polarity set of diodes; an insulating layer located on said first heat sink; a second heat sink having a second polarity set of diodes and disposed on said insulating layer; a connection cover mounted on said second heat sink; a capacitor connected to said connection cover and to said second heat sink; and a B+ stud mounted on said second heat sink and going through the alternator slip-ring-end, said first heat sink and insulating layer.

12 Claims, 13 Drawing Sheets

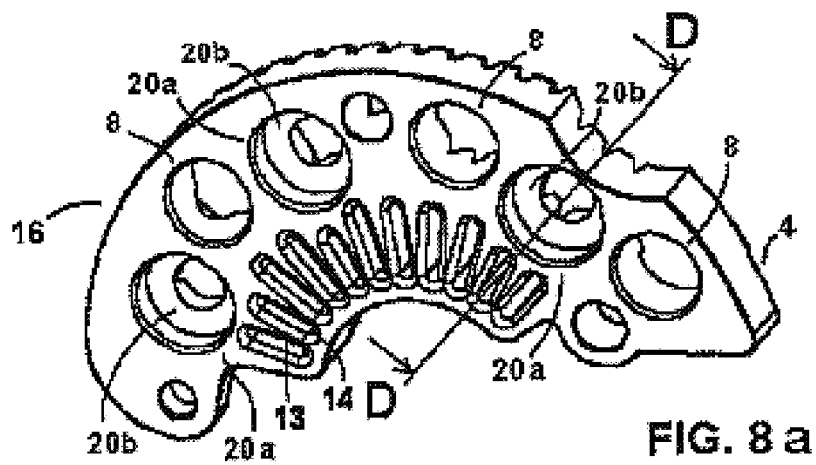
FIG. 8a
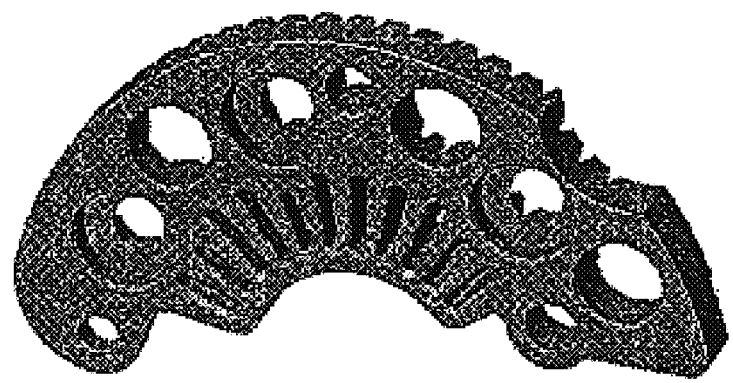
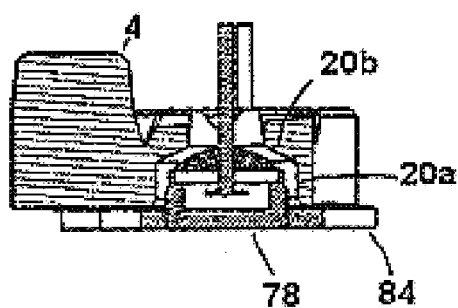
FIG. 8b    Sect. D-D FIG. 8a

Section B-B in FIG. 10

FIG. 18
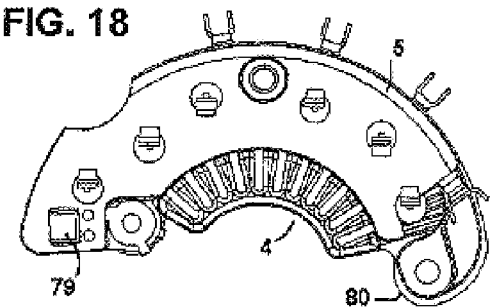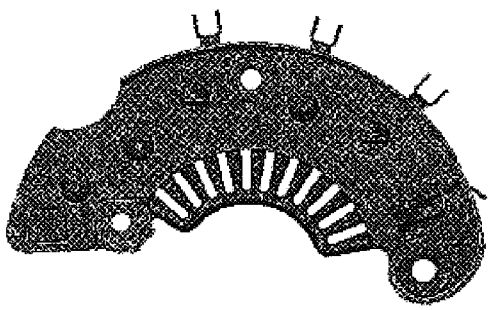
FIG. 19
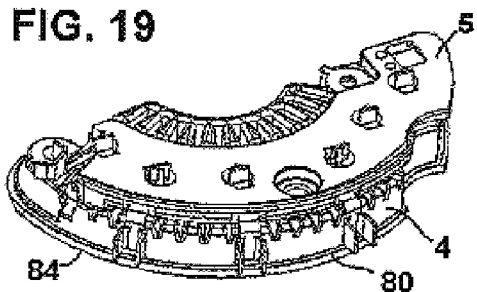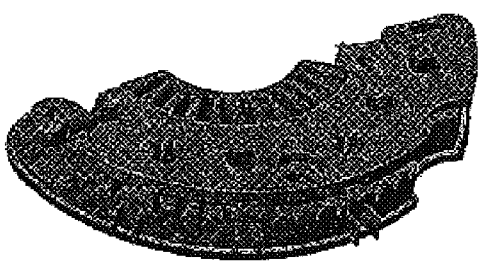
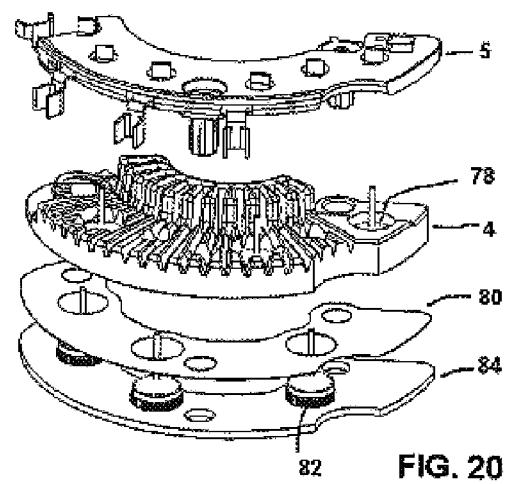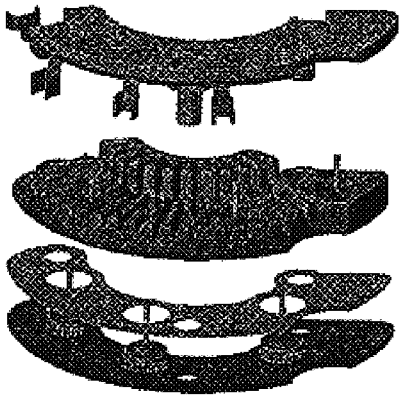
FIG. 20

US 6,731,030 B2

HIGH PERFORMANCE BRIDGE RECTIFIER FOR DIODE-RECTIFIED ALTERNATING CURRENT GENERATOR

BACKGROUND OF THE INVENTION

1. Field of the Invention

The present invention generally relates to bridge rectifiers for rectifying the current output of an alternating current generator. More specifically, the present invention relates to a high performance bridge rectifier which utilizes an improved first heat sink, an improved carrier plate second heat sink, an improved connection cover of the rectifier, improved first polarity and second polarity diodes, improved diode layout over the first and the second heat sinks, improved diode contact with the electrical contacts of the rectifier, and said rectifier is especially characterized by an improved B+ stud that more efficiently dissipates heat to properly cool the rectifier while providing current to various electrical loads such as, for example, a motor.

2. Background of the Related Art

Bridge rectifiers are used to rectify current output from alternative current sources, such as an alternating current generator. Bridge rectifiers for motor vehicle alternators are well known in the art and generally include two metal parts used as heat sinks that are electrically insulated from each other. As a result of the current that is transmitted therethrough, the bridge rectifier becomes heated due to the internal power loss on each individual diode. Thus, the bridge rectifier must be properly cooled in order to be able to handle the maximum required current, while still being tolerant to increased temperatures due to internal power losses.

Each of the metal parts or carrier plates includes semiconductor diodes that are arranged to polarize the two metal parts into respective positive and negative direct voltage output terminals. The diodes are then connected to respective phase windings of an output winding of the alternating current generator.

The rectifier diodes are connected to respective carrier plates, and these carrier plates are used as heat sinks for these diodes as well. The rectifier diodes are typically inserted by pressure in receiving bore holes of the carrier plate or heat sink, or are soldered to the carrier plate using appropriate solder alloys. The end wires connected to the rectifier diodes enable the rectifier diodes to be connected to external sources.

The heat sinks are typically constructed in the shape of a circle or crescent and are fastened in the same plane to the alternating current generator.

Various difficulties or problems have occurred using this standard diode rectifier. For example, since the diode rectifier is mounted to an alternating current generator that is used with a motor, there are space limitations within the motor, for example, which limit the size of the diode rectifier. One prior art solution to this problem is constructing or fabricating the carrier plates that are connected to the rectifier diodes into a shape that is more than a half circle approximating the circular shape of the alternating current generator. The carrier plates are constructed as a positive heat sink and a negative heat sink and the two heat sinks are arranged coaxially in separate planes spaced apart by an axial distance from one another. See, for example, U.S. Pat. No. 4,952,829 to Armbruster, et al., incorporated herein by reference.

Another problem experienced with diode rectifiers includes the need to carefully match the diode characteristics in order to avoid imbalance in the amount of current conducted by the individual diodes. If thermal imbalance is experienced, certain diodes will increase current flow that may result in thermal runaway. Thermal runaway involves a diode that is unable to regulate its current flow and temperature. In this situation, the diode conducts increased current and experiences increased temperature until the individual diode is no longer able to sustain the normal working reverse voltage, and the diode is destroyed. Frequently, thermal runaway results in the destruction of an individual diode, and the destroyed diode becomes short-circuited thereby rendering the entire bridge rectifier inoperative.

Another problem which has been encountered in bridge rectifiers is that the bridge rectifiers must not only be able to withstand normal battery charging current, but must also be able to supply current, perhaps as much as ten times the normal charging current. These increased current situations may occur, for example, when the motor vehicle is being started. Bridge rectifiers, as discussed, are typically unable to absorb or conduct these types of excess currents and are also unable to rapidly dissipate the resulting heat. Thus, the heat generated within the bridge rectifier may destroy the individual diodes. In order for bridge rectifiers to handle these types of excessive currents and heat, it becomes necessary to utilize a bridge rectifier, which has higher current handling capability. Due to the space limitations of the alternating current generator, it then becomes very difficult to provide such a bridge rectifier from a feasibility standpoint as well as at an economical cost.

A further attempt at increasing the current capacity and heat dissipating characteristics of the bridge rectifier includes the mounting of semiconductor diode chips onto first and second metallic heat sinks, which are electrically insulated from each other by a thin sheet of electrical insulating material. The diode chips are then covered by a protective insulating coating after connection to the respective heat sink. One of the metallic heat sinks includes a finned area, which is subjected to cooling air when the bridge rectifier is mounted to the generator. This type of bridge rectifier is shown in U.S. Pat. No. 4,606,000 to Steele, et al., and is incorporated herein by reference. The heat sink, with a plurality of fins, includes twelve air passages.

FIGS. 1a–1b are prior art illustrations of a similar bridge rectifier as depicted in Steele et al. In FIG. 1a, combined alternator cover and carrier plate 2 includes carrier plate or heat sink 4 connected to alternator cover 6 (only partially depicted to expose underlying plate 4). Carrier plate 4 includes receiving bore holes 8, which are formed for receiving the diodes. Carrier plate 4 includes alternator-mounting holes 10 for mounting carrier plate 4 to the alternator cover 6 via standard connection means, such as a stud or screw connection. Alternator cover 6 includes three main alternator air passages, which interact with the twelve air passages 14 in carrier plate 4, thereby cooling radiating fins 13. As depicted in FIG. 1b (alternator cover 6 omitted for simplicity), carrier plate 4 is of a rectangular shape (in side view) having the air passages 14 going completely through carrier plate 4.

FIG. 2 is a prior art illustration of the positioning of the bridge rectifier 1 within a standard alternating current generator. As depicted in FIG. 2, the completely assembled bridge rectifier 1, which includes carrier plate and cover 1a, is connected to alternator cover 6 via any standard connection means, such as screws 7. Reference numeral 3 denotes the bottom of carrier plate 4, while reference numeral 5 denotes the top of carrier plate 4. Bridge rectifier 1 is also connected to regulator 9. As mentioned previously, the standard bridge rectifier shown in Steele et al. and FIGS. 1a–1b is well known in the art, and may also be purchased from Wetherill Associates Inc. of Royersford, Pa. as part no. 31-113, including cover part no. 46-1858.

FIGS. 3a–3b illustrate a prior art solution presented by U.S. Pat. No. 5,646,838 to Integral Automotive S.A. of Luxemburg, and invented by 3 of the 4 inventors of the present invention, with a bridge rectifier using a first heat sink 84, an insulator layer 80, a second heat sink 4, with heightened plateau area 18 over the base section area 16, and an improved convection surface area over the base section, using ridges 54 for better cooling. Again shown are receiving bore holes 8, alternator-mounting holes 10, cooling radiating fins 13 and air passages 14.

The prior art relates to a bridge rectifier for an alternating current generator, including a first heat sink, an insulating layer disposed on the first heat sink and a second heat sink disposed on the insulating layer. While there have been, as described above, several attempts to increase the current and heat capacity of the bridge rectifier, none of these prior attempts have been completely satisfactory. That is, none of these prior art attempts have increased the current and heat capacity of the bridge rectifier in an economical manner and to a degree where the rectifier can perform satisfactorily for a long period of time.

As a result of dissatisfaction with existing bridge rectifiers, significant problems have been discovered, which are the root cause of the poor performance characteristics of prior art bridge rectifiers. These problems reside in insufficient usage of the local resources offered by the alternator cover. Such local resources include slip-ring-end resources in the conduction surface area, and the resource of the free vertical dimension, which could be used for increased volume of the rectifier carrier plate for improved electrical and thermal conduction and for enhanced forced convection. All prior art designs use standard diodes, not optimized for the specific thermal transfer of each heat sink of the bridge rectifier.

Other problems are related to unbalanced diode layout of the prior art rectifiers, hence unbalanced thermal load applied on the rectifier creating exceedingly hot areas where the risk of failure is greatly increased, and the resulting defects or failures which arise therefrom. Another drawback of the related art is the failure to identify all heat sources of the bridge rectifier, thus creating the possibility of a thermally unbalanced design and extra thermal stress on the diodes. Prior art designs did not consider all means of heat evacuation, especially from the second (positive) heat sink, only focusing on convection, and disregarding features that could also increase conduction. The second heat sink prior art designs also do not use all the means possible to increase the heat sink capacity to transport and dissipate heat from the diodes through both conduction and convection. Conduction and convection surface area and volume are not optimized.

Thus, it would be desirable to provide a high performance bridge rectifier that overcomes the problems of prior art.

SUMMARY OF THE INVENTION

Accordingly, it is a principal object of embodiments of the present invention to provide a high performance bridge rectifier, which is able to increase the current and heat capacity characteristics of the bridge rectifier at an economical cost.

It is another object of embodiments of the present invention to provide an increased current and heat capacity bridge rectifier which includes a first (negative) heat sink with maximized conduction surface area, in direct contact with the alternator top cover—the slip-ring-end, allowing increased heat transfer from the negative diodes and from the second (positive) heat sink, through the electrically insulating, but thermally conductive separator foil.

It is yet another object of embodiments of the present invention to provide an increased current and heat capacity bridge rectifier which includes a first (negative) heat sink with optimal thickness, allowing a lower thermal impedance to the heat transfer from the second (positive) heat sink, through conduction, to the alternator slip-ring-end body, offering at the same time reduced production costs. The thickness of this heat sink has been harmonized with the negative diode design, so that maximum heat conduction is possible.

It is still another object of embodiments of the present invention to provide an increased current and heat capacity bridge rectifier which includes a first (negative) heat sink having a new diode layout, for better balancing heat loads on the rectifier, and a lower maximum working temperature.

It is a further object of embodiments of the present invention to provide an increased current and heat capacity bridge rectifier which includes a second (positive) heat sink or carrier plate, having a base section area, increased in height, thereby increasing the volume of the carrier plate to increase the current and thermal characteristics, also the convection surface area. While it is difficult to increase the surface area of the carrier plate in the radial direction, i.e., in the same plane as the carrier plate, it is nevertheless possible to increase the depth or height of the forced-cooling fin-section in the carrier plate and the base section to be coextensive with the cover of the carrier plate, since this additional space had not been previously utilized.

It is yet a further object of embodiments of the present invention to provide an increased current and heat capacity bridge rectifier which includes a second (positive) heat sink or carrier plate, having maximized base contact surface area for optimized conduction to the thermally conductive foil and the first heat sink.

It is still a further object of embodiments of the present invention to provide an increased current and heat capacity bridge rectifier which includes a second (positive) heat sink or carrier plate, having deep grooves on the top face of the base section, offering considerably increased convection area to further cool the rectifier said heat sink. These grooves connect to the vertical radial slots in the base section and plateau section of the heat sink, thus expanding the area of the second heat sink included in the forced convection process, greatly increasing cooling performance.

It is yet still another object of embodiments of the present invention to provide an increased current and heat capacity bridge rectifier which includes a second (positive) heat sink or carrier plate, having a plateau section area with increased height thus enabling a large surface area used for forced convection and better cooled first heat sink and diodes.

It is yet still a further object of embodiments of the present invention to provide an increased current and heat capacity bridge rectifier which includes a second (positive) heat sink or carrier plate, having optimized diode layout for balanced thermal load distribution over the whole heat sink.

It is still another object of embodiments of the present invention to provide an increased current and heat capacity bridge rectifier which includes a second (positive) heat sink or carrier plate, having cylindrical counter bore slots with dome shaped ceilings to accommodate the negative diodes of the first (positive) heat sink, without impeding on the convection surface area of said heat sink carrier plate base section.

It is still yet another object of embodiments of the present invention to provide an increased current and heat capacity bridge rectifier which includes a connection cover, having a bottom area at a certain small distance with respect to the top face of the carrier plate base section, this bottom face having filleted radial edges on the inside and the outside. These fillets and distance allow the low pressure created by the alternator fan in the vertical radial slots to suck in air over the top of the carrier plate base section, and through the grooves, creating a new area cooled by forced convection in the rectifier.

It is still a further object of embodiments of the present invention to provide a rectifier connection cover, having a heightened cylindrical rim on the top outer edge thus blocking airflow in between the plastic diaphragm separating the rectifier-regulator area from the rest of the alternator case and the rectifier, and increasing the airflow over and through the grooves on the top face of the base section and through the radial slots. As a consequence, the working temperature will be further reduced.

It is yet a further object of embodiments of the present invention to provide a rectifier using specially designed passivated diodes, optimized for each of the heat sinks in terms of electrical and thermal conduction.

It is also an object of embodiments of the present invention to provide a rectifier using a specially designed positive stud, having a knurled cylindrical area which will be pressed into the second heat sink or carrier plate for improved electrical contact and low power dissipation, thus further helping in decreasing the thermal load on said heat sink and rectifier.

It is also another object of embodiments of the present invention to provide a rectifier where alloy soldering has been eliminated almost totally, all electrical contacts outside the diode casings being done by mechanical (press-fit) or ultra-sonic methods.

In brief, one embodiment of the present invention is a bridge rectifier for an alternating current generator having a slip-ring-end, comprising: a first heat sink having a first polarity set of diodes; an insulating layer located on the first heat sink; a second heat sink having a second polarity set of diodes and disposed on the insulating layer; a connection cover mounted on the second heat sink; a capacitor connected to the connection cover and to the second heat sink; and a B+ stud mounted on the second heat sink and going through the alternator slip-ring-end, the first heat sink and the insulating layer. In additional embodiments, the second heat sink comprises: a base section including first and second areas; dome shaped holes into the second heat sink and receiving the first polarity set of diodes therein; diode receiving holes in the base section and receiving the second polarity set of diodes therein; and a plateau section disposed on the first area of the base section.

In yet further embodiments, the connection cover is mounted on the base section and covers the second area of the base section. In other embodiments, the B+ stud includes a knurled area comprising knurled teeth, and wherein the stud is inserted into a corresponding hole in the second heat sink with the knurled teeth penetrating the walls of the hole. In other embodiments, the first heat sink comprises a substantially symmetrical diode layout. Further embodiments exist wherein a negative diode is adjacent to a corresponding hole for the B+ stud. In other embodiments, the second heat sink has a heightened plateau section. Further embodiments exist wherein the second heat sink has a substantially symmetrical diode layout.

In yet further embodiments, the second heat sink further comprises radial air grooves disposed on a top surface of the base section. In other embodiments, the second heat sink further comprises dome shaped holes to accommodate the first polarity set of diodes into the base section of the second heat sink.

In additional embodiments, the connection cover has filleted bottom inner and outer edges. Other embodiments exist wherein the connection cover has a heightened radial rim over the outer edge of the top face of the connection cover to block airflow over the top face.

In yet further embodiments, the diodes of the first polarity set of diodes mounted on the first heat sink are of different dimensions than the diodes of the second polarity set of diodes. In additional embodiments, the diodes comprise diode casings, and wherein all electrical contacts which are external to the diode casings are exclusively mechanically press-fit. Alternatively, the diodes may comprise diode casings wherein all electrical contacts which are external to the diode casings are exclusively ultrasonically joined technologies.

In brief, another embodiment of an aspect of the present invention is a heat sink for a bridge rectifier comprising: a plurality of diodes arranged in a substantially symmetrical diode layout; and wherein at least one diode is a negative diode adjacent to a corresponding hole for a B+ stud.

In further embodiments, the heat sink further comprising a heightened plateau section area. The heat sink may also further comprise radial air grooves disposed on the top surface of a base section of the heat sink to maximize convection surface area and allow for radial airflow on the surface. Other embodiments of the heat sink exist further comprising dome-shaped holes to accommodate a first polarity set of diodes into a base section of the heat sink, without impeding on the grooved convection area.

In brief, another embodiment of an aspect of the present invention is a connection cover for a bridge rectifier comprising: a top face; filleted bottom inner and outer edges to facilitate and create airflow over a top surface of a base section of a heat sink; and a heightened radial rim over the outer edge of the top face of the connection cover, to block airflow over the top face, thus facilitating cooling airflow between the connection cover and the top face of the base section of the second heat sink.

In brief, another embodiment of an aspect of the present invention is a B+ stud for a bridge rectifier comprising: a knurled area comprising knurled teeth adapted for insertion into a corresponding hole in a heat sink; wherein the knurled teeth penetrate the walls of the hole.

In brief, another embodiment of an aspect of the present invention is a method to increase the current generating capabilities of a current generating source having a slip-ring-end seating area, comprising the steps of: maximizing conduction area of a first heat sink in contact with the slip-ring-end seating area; decreasing the thickness of the first heat sink; optimizing diode layout on the first heat sink for balanced thermal load on the bridge rectifier; maximizing the conduction area of a second heat sink in contact through an insulating layer of the first heat sink to the first heat sink; heightening a base section of the second heat sink to enhance thermal and electrical conduction through the heat sink; heightening a plateau section area of the second heat sink to enhance forced convection performance of the second heat sink; optimizing the diode layout on the second heat sink for balanced thermal load and heat distribution over the second heat sink; adding radial air grooves on the second heat sink, disposed on the base section top surface to maximize convection surface area and allow for radial airflow on the surface; adding dome-shaped holes on the second heat sink to accommodate a first polarity set of diodes into the base section of the second heat sink; adding filleted bottom inner and outer edges on a connection cover to facilitate and create airflow over the top surface of the base section of the second heat sink; adding a heightened radial rim over the outer edge of the top face of the connection cover to block airflow over the top face; and providing a B+ stud that includes a knurled area comprising knurled teeth, wherein the stud is inserted into a corresponding hole on the second heat sink with the knurled teeth penetrating the hole-walls in the second heat sink body; wherein the first polarity set of diodes, mounted on the first heat sink, are designed for maximum direct bottom thermal conduction to the alternator slip-ring-end, while still retaining intact lateral conduction properties; and wherein a second polarity set of diodes, mounted on the second heat sink, are designed for maximum lateral thermal conduction to the second heat sink, while still retaining intact bottom conduction properties.

Another embodiment of that aspect of the invention exists further comprising contacting all electrical contacts which are external to the diodes exclusively through a mechanical press-fit. Alternatively, all electrical contacts which are external to the diodes are contacted exclusively through ultrasonic technologies.

BRIEF DESCRIPTION OF THE DRAWINGS

FIGS. 8a–8b are respectively isometric and section views of the second (positive) heat sink of the bridge rectifier including the negative diode counter bore sockets with dome shaped ceiling, according to embodiments of the present invention;

FIG. 18 is a front view of the bridge rectifier, according to embodiments of the present invention;

FIG. 19 is an isometric view of the bridge rectifier, according to embodiments of the present invention;

FIG. 20 is an exploded view of the bridge rectifier, according to embodiments of the present invention;

DETAILED DESCRIPTION OF PREFERRED EMBODIMENTS

Many of the failures that have occurred in the prior art bridge rectifier devices are a result of the failure of the carrier plate in the bridge rectifier to handle excessive current and temperature. Hence, the rectifier runs too hot, and the diodes will have a short operational life. The high temperature of the rectifier is a result of the following reasons: unbalanced diode layout; insufficient conduction and convection cooling of the first and second heat sinks; unnecessary heat sources present on prior art rectifiers due to imperfect electrical contact; and non-optimal design of the parts involved for the best heat evacuation parameters.

The basic problem that has not been sufficiently addressed by the prior art is how to make the carrier plate or heat sink itself capable of absorbing and dissipating the excess heat, or bearing these excessive conditions while still being able to manufacture the bridge rectifier at an economical cost.

Prior designs use a layout configuration that is not optimal from the temperature dissipation point of view, but is rather unbalanced. Hence, there is an increased difficulty in the above-mentioned temperature and current handling capabilities.

Prior art has been unable to properly cool the bridge rectifier, since prior art bridge rectifiers were not configured or structured to facilitate the introduction of air to cool the carrier plate and diodes.

Prior art also has not solved the problem of space limitations within the alternating current generator, and in particular, the specific configuration of the alternating current generator, which imposes various different forms of space limitations on the bridge rectifier, when mounted and disposed within the alternating current generator. Increasing the height of the carrier plate is not hampered by these space limitations.

Having identified each of the above problems, after considerable and careful study, these problems have been solved by providing a bridge rectifier in accordance with the principals of the present invention as discussed below.

Figures 1A, 1B:
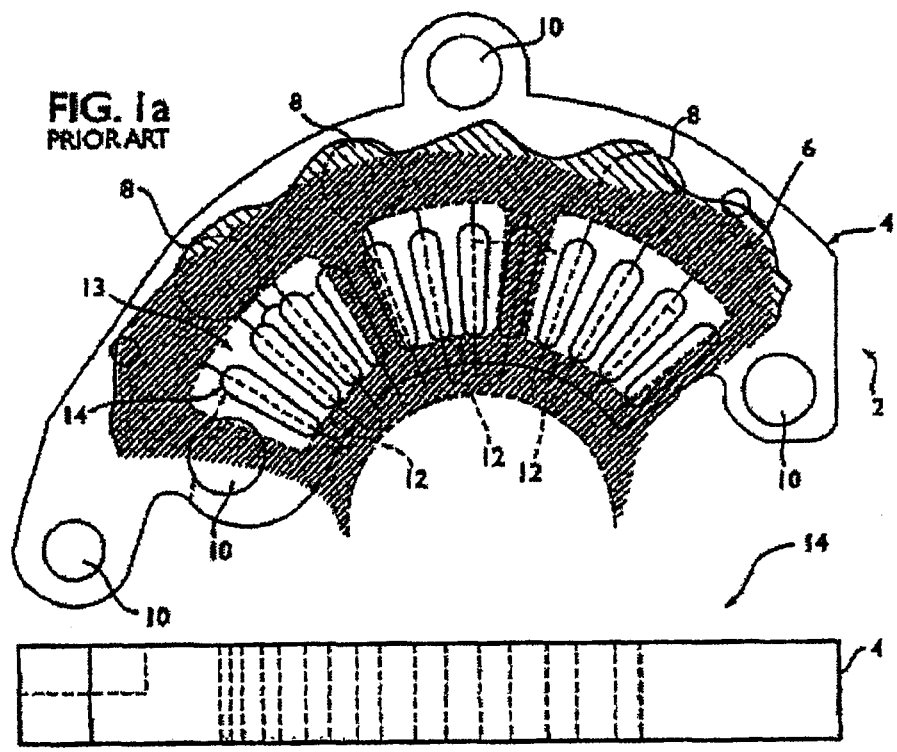
FIGS. 1a–1b are respective bottom and side views of a bridge rectifier according to the prior art.
Figure 2:
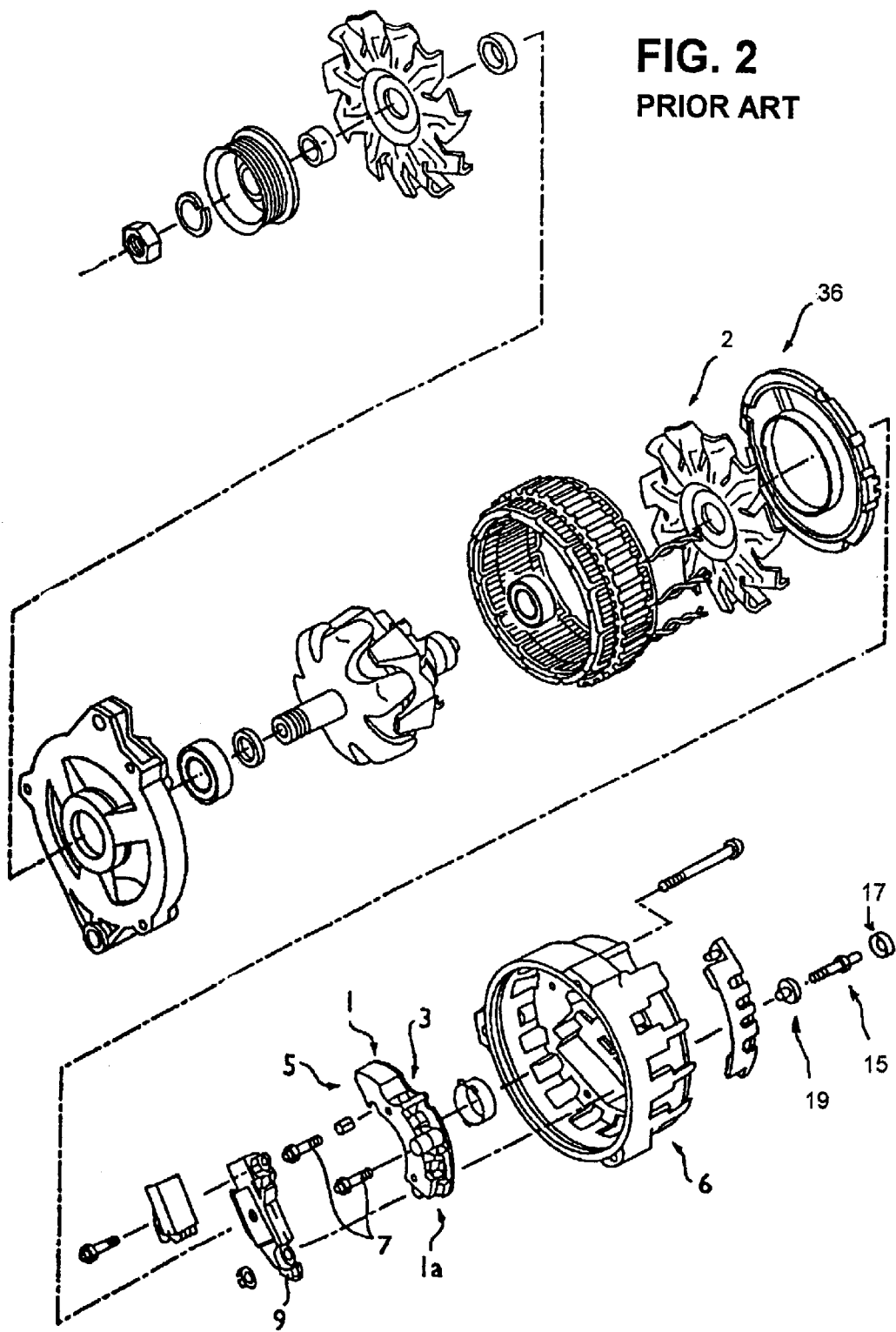
FIG. 2 is an exploded view showing the general configuration of an alternator assembly and the mounting of a bridge rectifier according to the prior art.
Figure 3A:
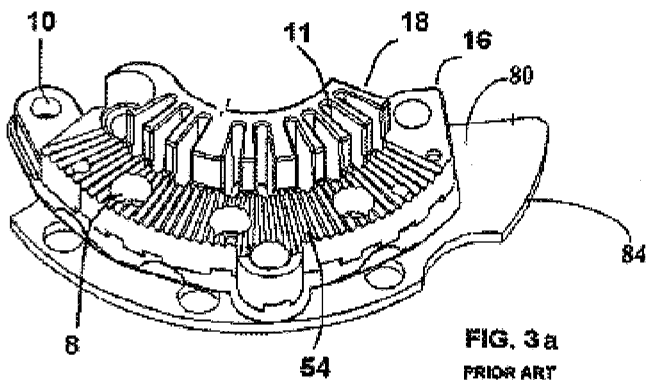
FIGS. 3a–3b are isometric views showing the top and the bottom of prior art first (negative) heat sink, insulator foil and second (positive) heat sink assembly and configuration.
Figure 3B:
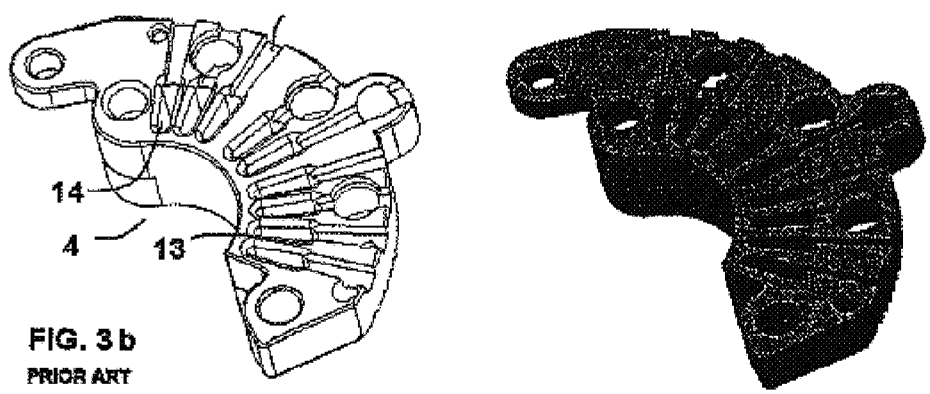
Figure 4A:
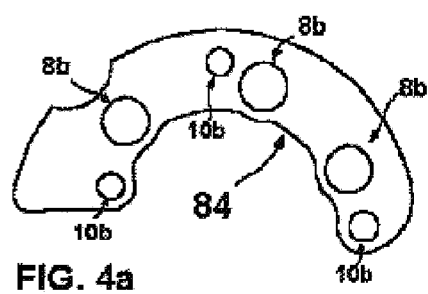
FIGS. 4a–4b are respectively a front view and an isometric view of the first (negative) heat sink of the bridge rectifier, with the insulating foil and negative diodes, according to embodiments of the present invention.
Figure 4B:
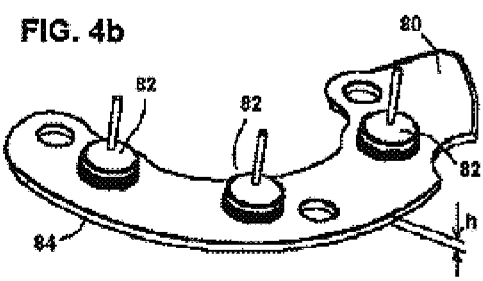

FIGS. 4a–4b are respectively a front view and an isometric view of the first (negative) heat sink 84 of the bridge rectifier, with the insulating foil 80 and negative diodes 82, according to the embodiments of the present invention. The front surface area of the first heat sink has been maximized as allowed by the mounting environment in the slip-ring-end of the alternator, thus providing enhanced thermal conduction of the heat generated by the second heat sink. The first heat sink 84 has also been reduced in thickness 'h', for lower thermal resistance of the heat transmitted through conduction from the second (positive) heat sink. The positive diode layout has also been optimized, so that the overall thermal characteristics of the rectifier are improved. Again shown are receiving bore holes 8b and alternator mounting holes 10b.

Figure 5:
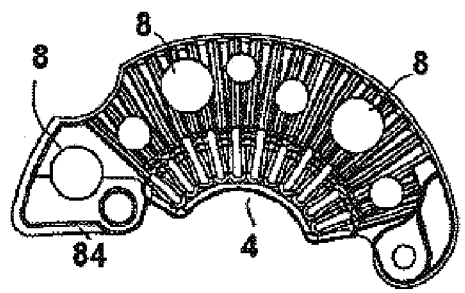
FIG. 5 is a front view of the second (positive) heat sink of the bridge rectifier according to embodiments of the present invention.

FIG. 5 is a front view of the second (positive) heat sink 4 of the bridge rectifier according to the embodiments of the present invention, as mounted over the first (positive) heat sink 84, having maximized contact surface with said first heat sink, for enhanced conduction of heat. Again shown are receiving bore holes 8.

Figure 6:
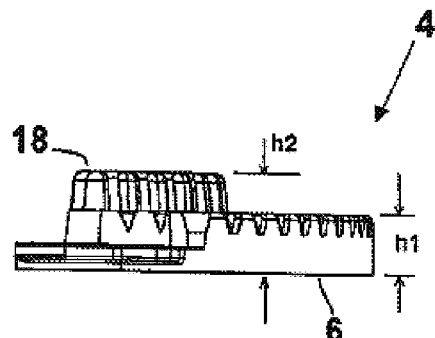
FIG. 6 is a side view of the second (positive) heat sink of the bridge rectifier, showing the increased height dimensions according to embodiments of the present invention.

FIG. 6 is a side view of the second (positive) heat sink 4 of the bridge rectifier, showing the increased height dimensions according to the embodiments of the present invention: increased base section 6 height h1; and increased plateau section 18 height h2. Height increase has as a result more volume and better electrical and thermal conduction parameters.

Figure 7A:
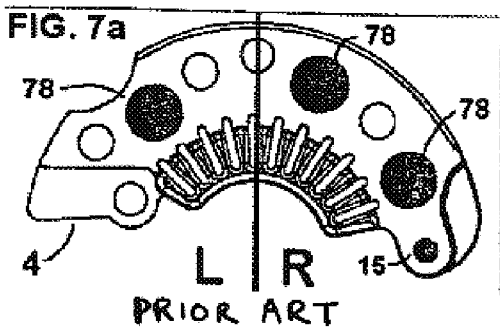
FIGS. 7a–7b are front views of the second (positive) heat sink of the bridge rectifier including the positive diode layout, respectively, according to the prior art and according to embodiments of the present invention.

FIG. 7a is a front view of the second (positive) heat sink 4 of the bridge rectifier, including the positive diode 78 layout according to the prior art. As it may be seen, in all prior art, the left side (marked with L) of the heat sink only contains one heat generator, as a positive diode 78. The right side of the heat sink (marked with R) contains two positive diodes 78 as heat generators. Also, this half of the heat sink contains the B+ stud 15 and corresponding mounting nut. Tests have shown the B+ stud is another heat generator in the rectifier assembly. Due to the poor electrical characteristics of the steel material comprising the stud relative to the high currents it has to carry, and due to variable electrical contact conditions, such as being submitted to vibrations, heat cycles and a frequently corrosive environment, a large amount of electrical resistance is concentrated in this component, thus generating substantial extra heat. As a consequence, in all prior art, the half of the second heat sink 4 containing the positive stud, will practically carry three heat generators, as opposed to only one in its other half. As a further consequence, the components in this half of the heat sink, meaning the positive diodes, starting with the one closest to the B+ stud will be submitted to extreme temperatures and are prone to fail rapidly.

Figure 7B:
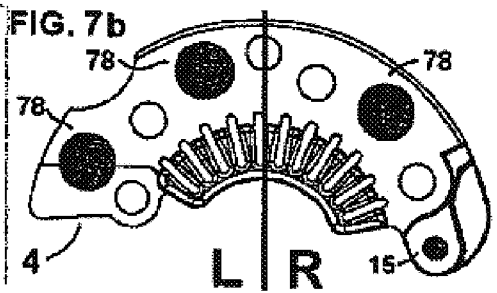
Figure 7C:
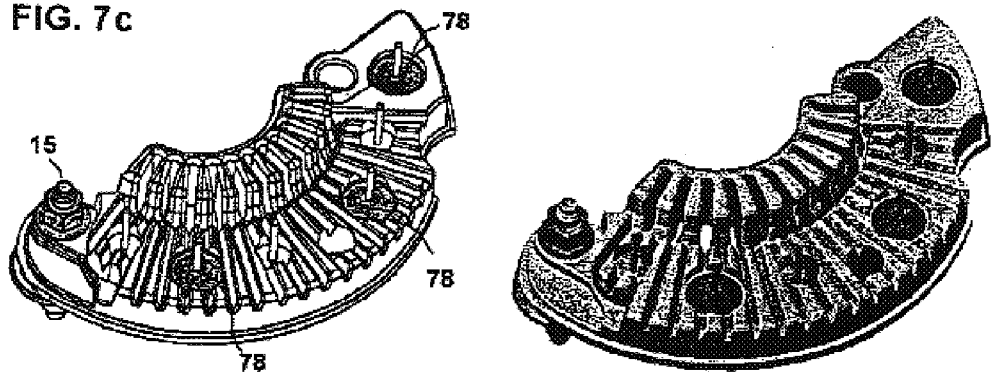
FIG. 7c is an isometric view of the second (positive) heat sink of the bridge rectifier including the positive diode layout, according to embodiments of the present invention.

FIGS. 7b–7c are respectively front and isometric views of the second (positive) heat sink 4 of the bridge rectifier including the layout of positive diodes 78, according to the embodiments of the present invention. Positive diodes 78 have been repositioned so that all heat generators on heat sink 4, including B+ stud 15, are evenly distributed over the whole surface, allowing for better heat evacuation, and avoiding over charging the diodes with extreme temperatures due to thermal unbalance. Thus, the three positive diodes and the B+ stud hole are substantially symmetrically located on the second heat sink.

FIGS. 8a–8b are, respectively, isometric and section views of the second (positive) heat sink of the bridge rectifier including the negative diode counter bore sockets with dome shaped ceiling, according to the embodiments of the present invention. Electrical contact between the negative diode 78 and the second heat sink 4 has to be avoided. Hence sockets (holes) 20a have to be created in positive heat sink 4. According to the embodiments of the present invention these sockets were not designed to penetrate all the way through, but are limited to exactly the necessary height to avoid electrical contact with the negative diode. In this mode an important conduction and convection area has been left in the base section 16 of the second heat sink 4-carrier plate.

Figure 9A:
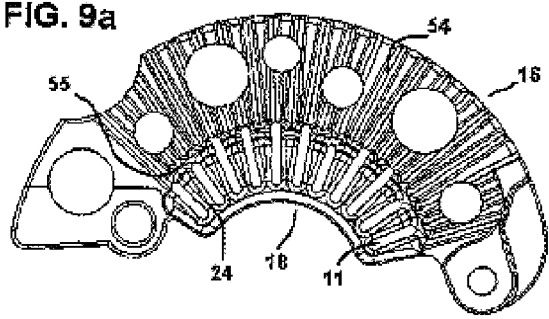
FIGS. 9a–9b are respectively front and isometric views of the second (positive) heat sink of the bridge rectifier including the deep grooves on the top face of the base section, according to embodiments of the present invention.
Figure 9B:
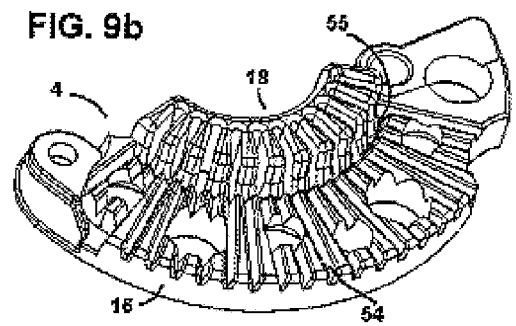

FIGS. 9a–9b are respectively front and isometric views of the second (positive) heat sink of the bridge rectifier including the deep grooves on the top face of the base section, according to the embodiments of the present invention. According to the embodiments of the present invention deep radial grooves 54 have been designed on the top face of the base section 16 of the second (positive) heat sink 4, which considerably increase the convection surface area of said face. These grooves connect in a common channel 55 which also makes the connection with the slots 11 and fins 24 of the plateau section of the second heat sink, bringing said grooves on the base section into the forced convection circuit.

Figure 10:
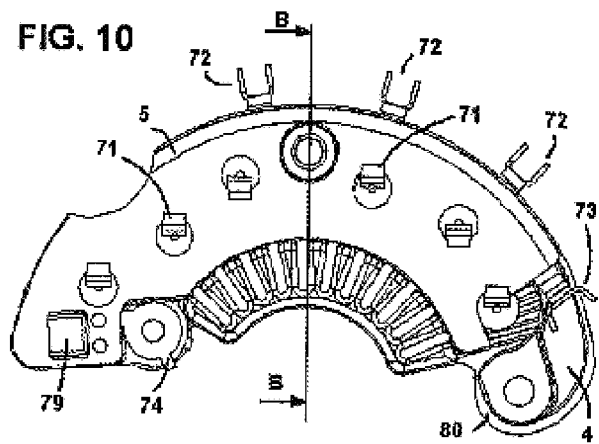
FIG. 10 is a front view of the bridge rectifier including the connection cover, according to embodiments of the present invention.

FIG. 10 is a front view of the bridge rectifier including the connection cover, according to the embodiments of the present invention.

Figure 11:
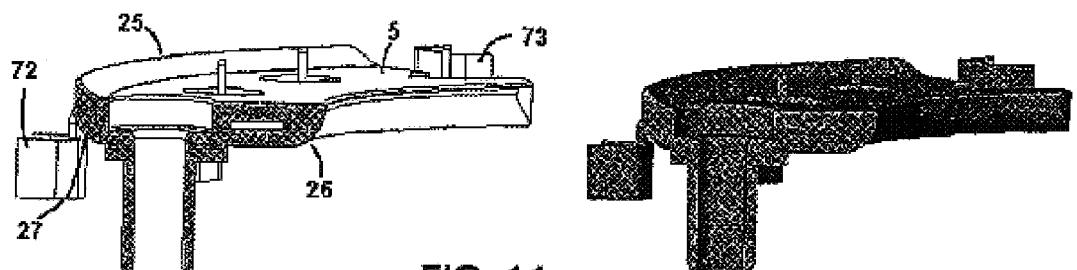
FIG. 11 is a section view of the connection cover as per section line B—B in FIG. 10, according to embodiments of the present invention.

FIG. 11 is a section view of the connection cover as per section line B—B in FIG. 10. According to the embodiments of the present invention the bottom face of the connection cover 5 of the bridge rectifier has been specially designed to favor airflow under said cover and above the top grooved face of the base section 16 of the second heat sink 4. To this purpose, the outer radial edge 27 on the bottom face of the rectifier connection cover has been filleted, as well as the inner radial edge 26. At the same time on the top face of the connection cover 5 the outer radial edge has been lifted into a rim 25. This rim will block airflow above the connection cover and below the plastic diaphragm 36, thus enhancing airflow below the connection cover and through the grooves, further helping in cooling the rectifier. See FIG. 14 for airflow explanations.

Figure 12:
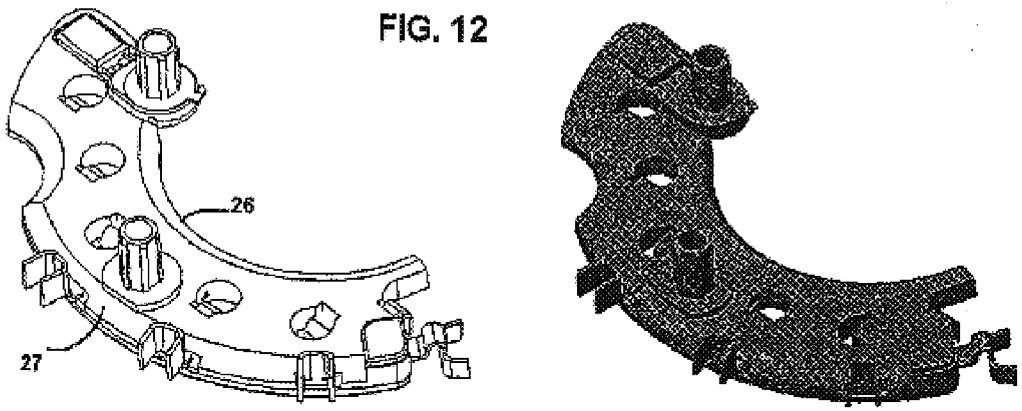
FIG. 12 is an isometric bottom view of the connection cover, according to embodiments of the present invention.

FIG. 12 is an isometric bottom view of the connection cover, according to the embodiments of the present invention.

Figure 13:
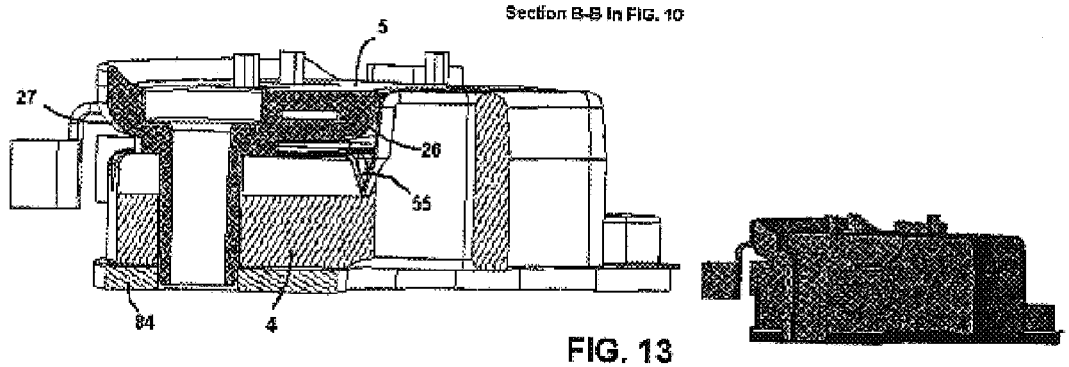
FIG. 13 is a section view of the bridge rectifier including the connection cover, as per section line B—B in FIG. 10, according to embodiments of the present invention.

FIG. 13 is a section view of the bridge rectifier including the connection cover, as per section line B—B in FIG. 10, according to the embodiments of the present invention. Space has been created between the grooved base section and the connection cover. Thereby airflow through this space and through the grooves is generated.

Figure 14:
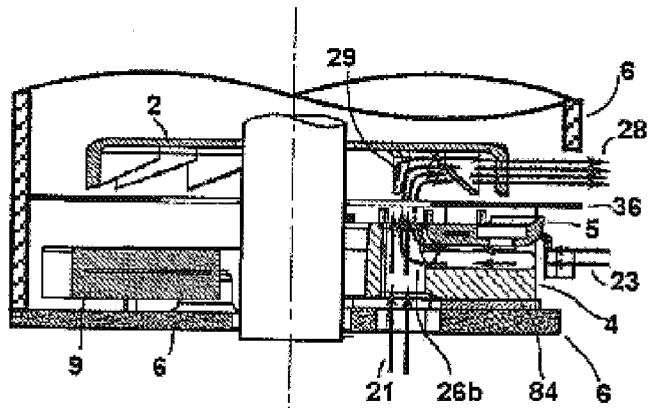
FIG. 14 is a section view of the alternator cover (slip-ring-end) including the bridge rectifier, according to embodiments of the present invention, the separator diaphragm, and the fan propeller, showing the forced convection air circulation, according to embodiments of the present invention.

FIG. 14 is a section view of the alternator cover (slip-ring-end) including the bridge rectifier, the separator diaphragm, and the propeller fan, showing the forced convection air circulation, according to the embodiments of the present invention. The propeller fan 2 runs the 'forced convection cooling engine' of the rectifier, creating an airflow, of which advantage is taken, by the rectifier, through the features of the present invention. The fan sucks the air in axially and pushes it out in a radial direction, creating a lowest pressure area 29, and a highest pressure area 28. Part of the air 21 is entering the slot-fin area of the plateau section of the second (positive) heat sink 4, and cooling said fins, and thus the second heat sink. The present invention features a specially designed connection cover 5, which allows and creates an airflow 23 in the area between the second heat sink 4 base section 6 and the bottom surface of said connection cover. The air entrance is facilitated by the outer radial filleted bottom edge of the connection cover body 27 in FIGS, 11, 12 and 13. This airflow is then entering the main stream 21, in the 26b area, where the flow is facilitated by the inner-filleted edge (26 in FIGS. 11, 12, 13) of the connection cover body bottom surface.

Figure 15:
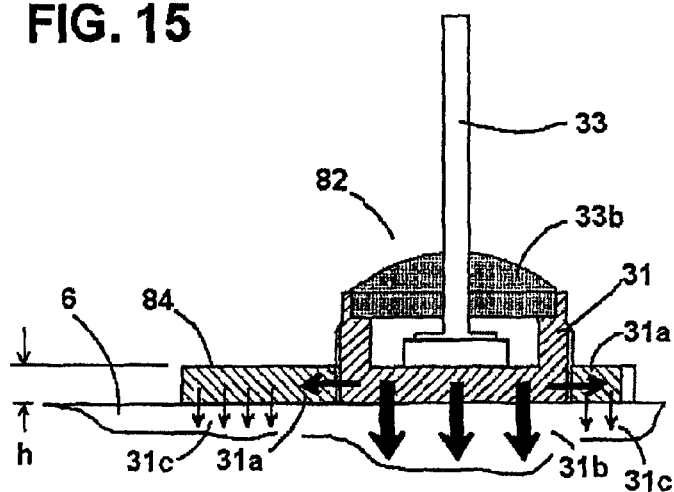
FIG. 15 is a section view of the first (negative) heat sink and the negative diode mounted on it, showing heat transfer modes according to embodiments of the present invention.

FIG. 15 is a section view of the first (negative) heat sink 84 and the negative diode 82 mounted on it, showing heat transfer modes according to the embodiments of the present invention. Diode base 31 is designed to have a thin bottom area for enhanced direct conduction 31b to the slip-ring-end frame 6. The thickness of the diode base bottom was designed to be equal to that of the first heat sink 84, which is 'h', thus also maximizing side conduction with this said heat sink, using indirect conduction mode 31a plus 31c.

Figure 16:
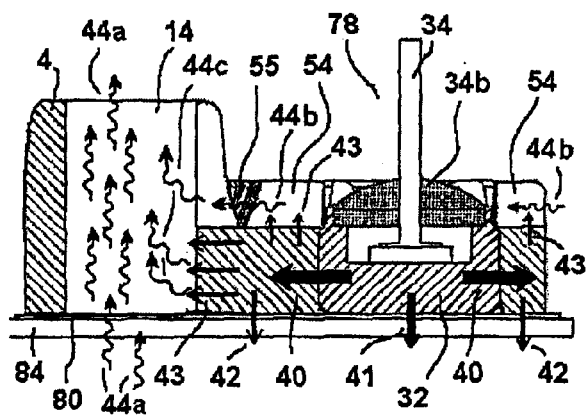
FIG. 16 is a section view of the second (positive) heat sink and the positive diode mounted on it, showing heat transfer modes according to embodiments of the present invention.

FIG. 16 is a section view of the second (positive) heat sink 4 and the positive diode 78 mounted on it, showing heat transfer modes according to the embodiments of the present invention. The positive diode has thicker diode base bottom to favor side conduction 40, which will further carry the heat through radial conduction 43 to the 'forced convection cooling engine' area, and ultimately will be taken away through the convection flow 44c. The forced convection area—having the radial slot-fin structure (see 14 and 13 in FIG. 8a)—is washed by the axial convection airflow 44a, which is the main cooling air stream of the forced convection process.

An important part of the heat generated in the diode section (or the base section) of the second heat sink 4 goes upwards through conduction 43 to the base section top surface area with its deep radial grooves 54 considerably enlarging the heat dissipating capability of the base section. The grooves are washed by radial airflow 44b, created through an original mechanism by the features of the present invention. This convection flow will be finally sucked-in by the main cooling airflow 44a and evacuated.

Some of the conducted heat 40 generated by the positive diode 78 into the second heat sink 4 base section will also be evacuated through conduction 42 with the thermally conductive foil 80 and the first heat sink 84 to the slip-ring-end frame. Another important part of the heat generated by the positive diode 78 will be directly conducted as heat flow 41 through the diode base bottom to the thermally conductive foil and the first (negative) heat sink 84 and the slip-ring-end frame 6.

Figure 17:
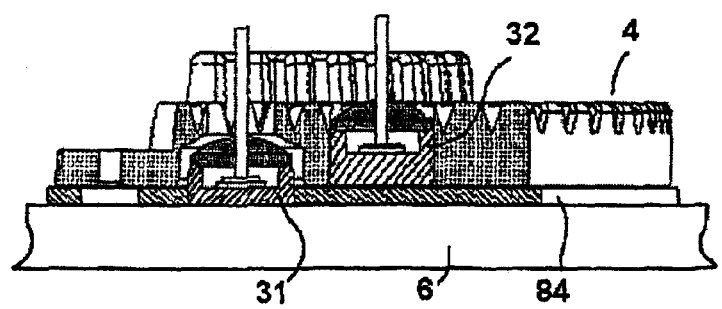
FIG. 17 is a section view of the first (negative) heat sink and the negative diode mounted on it, the second (positive) heat sink and the positive diode mounted on it, according to embodiments of the present invention.

FIG. 17 is a section view of the first (negative) heat sink and the negative diode mounted on it, the second (positive) heat sink and the positive diode mounted on it, according to the embodiments of the present invention.

FIG. 18 is a front view of the bridge rectifier, according to the embodiments of the present invention.

FIG. 19 is an isometric view of the bridge rectifier, according to the embodiments of the present invention.

FIG. 20 is an exploded view of the bridge rectifier, according to the embodiments of the present invention.

Figure 21:
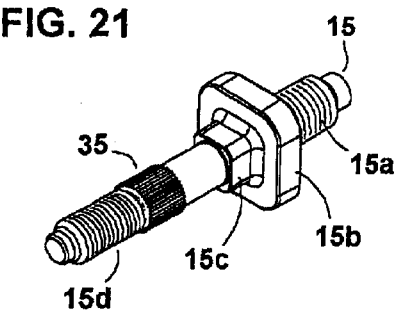
FIG. 21 is an isometric view of the B+ stud, according to embodiments of the present invention.

FIG. 21 is an isometric view of the B+ stud, according to the embodiments of the present invention.

Figure 22:
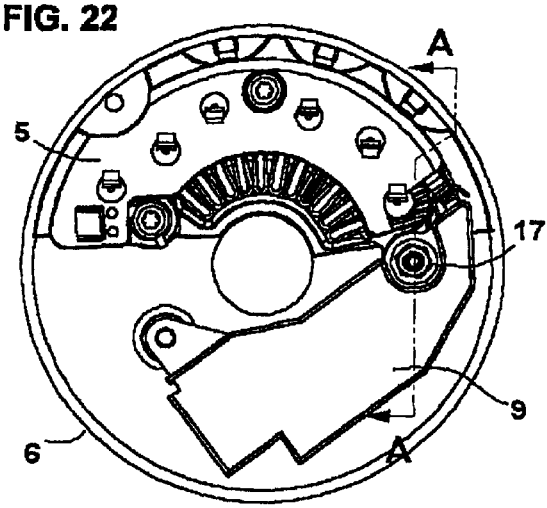
FIG. 22 is a front view of the alternator cover (slip-ring-end), with the bridge rectifier according to embodiments of the present invention.

FIG. 22 is a front view of the alternator cover (slip-ring-end), with the bridge rectifier according to the embodiments of the present invention.

Figure 23:
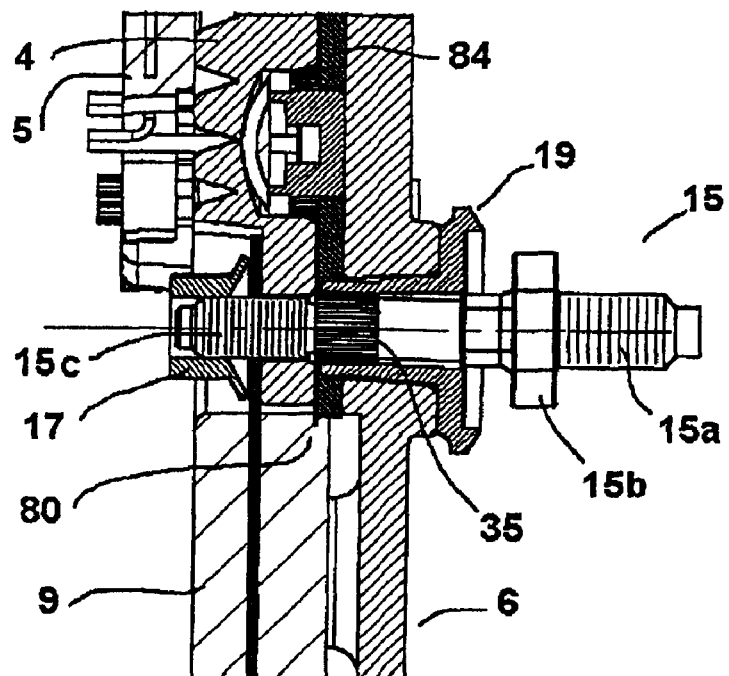
FIGS. 23–24 are section views of the bridge rectifier, as per section line A—A in FIG. 22, through the B+ stud assembly area, showing the stud mounting steps, according to embodiments of the present invention.
Figure 24:
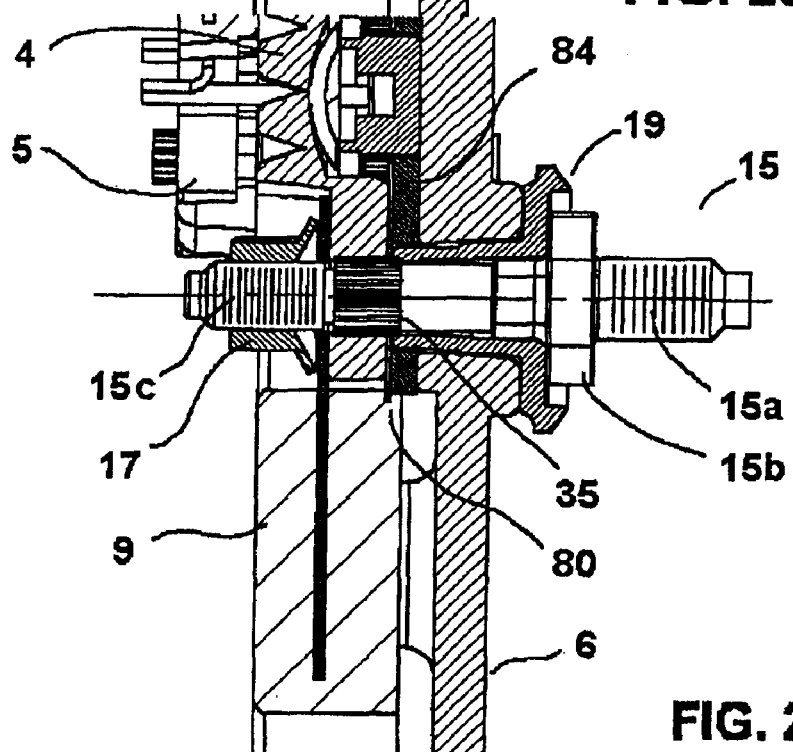

FIGS. 23–24 are section views of the bridge rectifier, as per section line A—A in FIG. 22, through the B+ stud assembly area, showing the stud mounting steps, according to the embodiments of the present invention.

According to the embodiments of the present invention, on the shaft 15c of the B+ stud, a knurled area 35 has been designed. When the stud is mounted on the rectifier these knurls will bite into the second (positive) heat sink 4 creating a very good electrical contact with said heat sink. FIG. 23 shows the stud 15 inserted in the plastic bushing 19 mounted in its socket in the slip-ring-end 6, in the mounting position right before the knurl area 35 makes contact with the positive heat sink 4. Now the action of the positive nut 17 begins. The rotation of the nut 17 pulls the stud 15 with the knurled area 35 biting into the second heat sink ear. FIG. 24 shows the stud in its final mounted position with the squared section 15b fully resting on the plastic bushing 19 and the knurled area 35 almost totally inserted in the second heat sink 4. The improvement in electrical contact quality has as an important consequence over the total power dissipation on the stud, diminishing it, thus lowering the total thermal load on the rectifier.

Figure 25:
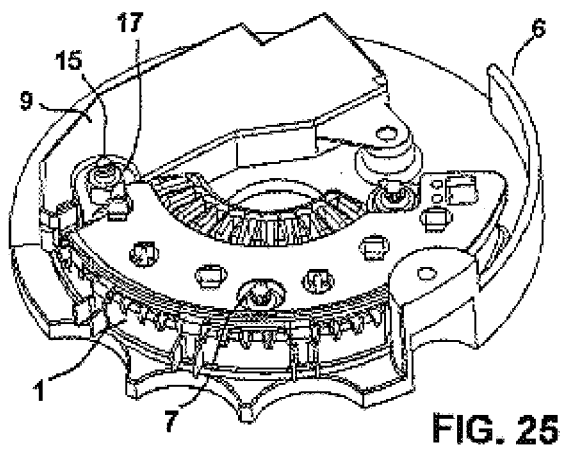
FIG. 25 is an isometric view of the bridge rectifier as mounted on the slip-ring-end plate, according to embodiments of the present invention.

FIG. 25 is an isometric view of the bridge rectifier as mounted on the slip-ring-end plate, according to the embodiments of the present invention.

Figure 26:
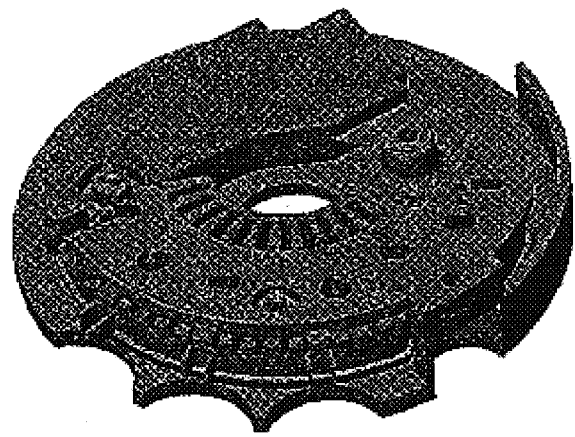
FIG. 26 is an isometric view of the bridge rectifier as mounted on the slip-ring-end plate, and the alternator fan propeller position, according to embodiments of the present invention.
Figure 26:
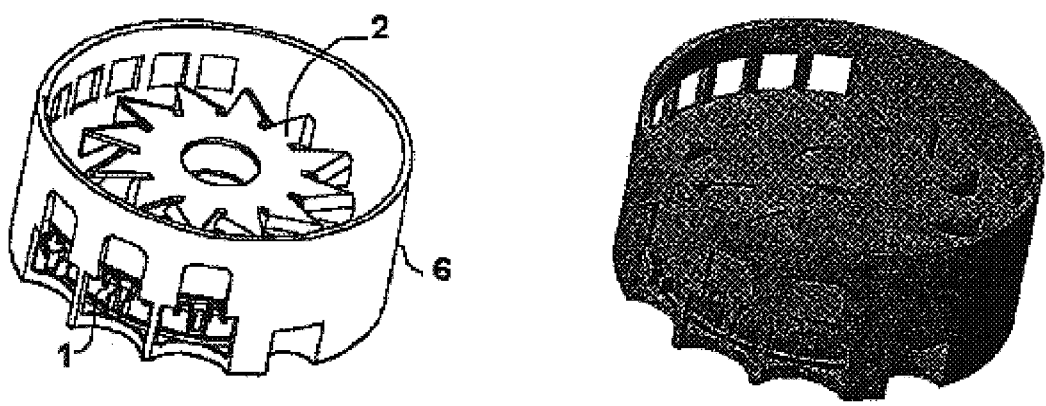

FIG. 26 is an isometric view of the bridge rectifier as mounted on the slip-ring-end plate, and the alternator fan propeller position (the alternator shaft and all components above are omitted from the picture), according to the embodiments of the present invention.

Figure 27:
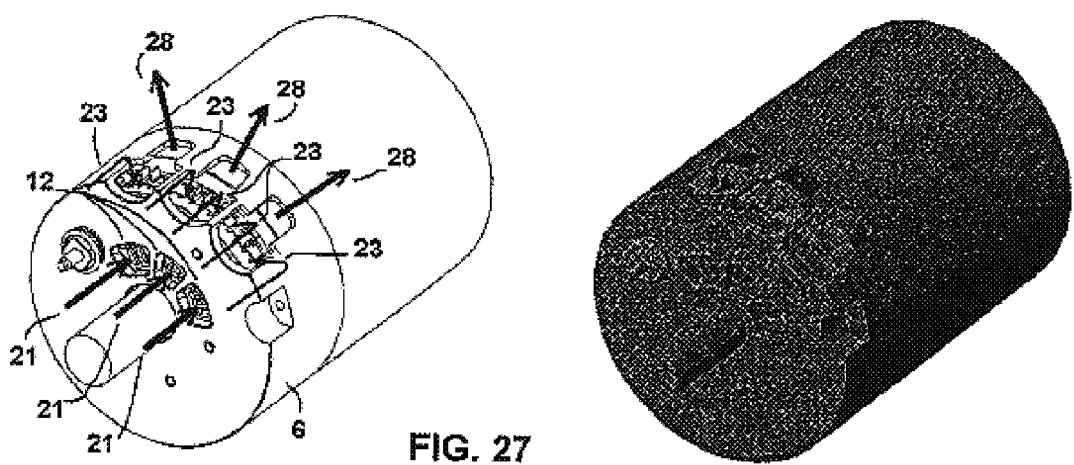
FIG. 27 is an isometric view of the bridge rectifier as mounted on the slip-ring-end plate in the alternator casing (schematic) and the air circulation, according to embodiments of the present invention.

FIG. 27 is an isometric view of the bridge rectifier as mounted on the slip-ring-end plate in the alternator casing (schematic) and the air circulation, according to the embodiments of the present invention. The alternator fan propeller (2 in FIG. 26) creates airflow through the rectifier in order to keep it to a lower functional temperature. The main stream of airflow 21 goes in through the windows 12 and is pushed out as airflow 28, above the plastic diaphragm 36, through the side windows of the slip-ring-end. Due to the new embodiments of the present invention another airflow 23 is generated in between the second heat sink carrier plate and connection cover 5 washing and cooling the grooves in the second heat sink 4 (see FIG. 14 for airflow details).

In accordance with the above principals of the present invention, an improved bridge rectifier is provided which is able to handle higher currents and tolerate increased temperature characteristics by providing an improved carrier plate which is able to be more efficiently cooled and able to tolerate increased current and temperature conditions.

The many features and advantages of the present invention are apparent from the detailed specification, and thus, it is intended by the appended claims to cover all such features and advantages of the invention that fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to falling within the scope of the invention.

What is claimed is:

1. A bridge rectifier for an alternating current generator having a slip-ring-end, comprising:
    a first heat sink having a first polarity set of diodes;
    an insulating layer located on said first heat sink;
    a second heat sink having a second polarity set of diodes and disposed on said insulating layer;
    a connection cover mounted on said second heat sink;
    a capacitor connected to said connection cover and to said second heat sink; and
    a B+ stud mounted on said second heat sink and going through the alternator slip-ring-end, said first heat sink and the insulating layer;
    wherein the second heat sink comprises:
        a base section including first and second areas;
        dome shaped holes into the second heat sink and receiving said first polarity set of diodes therein;
        diode receiving holes in said base section and receiving said second polarity set of diodes therein; and
        a plateau section disposed on the first area of said base section.

2. The bridge rectifier according to claim 1 wherein the connection cover is mounted on said base section and covers the second area of said base section.

3. A bridge rectifier according to claim 1, wherein said second heat sink has a heightened plateau section.

4. A bridge rectifier according to claim 1, wherein said second heat sink further comprises radial air grooves disposed on a top surface of the base section.

5. A bridge rectifier according to claim 1, wherein said second heat sink further comprises dome shaped holes to accommodate said first polarity set of diodes into the base section of the second heat sink.

6. A bridge rectifier according to claim 1, wherein said connection cover has filleted bottom inner and outer edges.

7. A bridge rectifier according to claim 1, wherein said connection cover has a heightened radial rim over the outer edge of the top face of said connection cover to block airflow over said top face.

8. A bridge rectifier according to claim 1, wherein the diodes of said first polarity set of diodes mounted on said first heat sink are of different dimensions than the diodes of said second polarity set of diodes.

9. A heat sink for a bridge rectifier comprising:
    a plurality of diodes arranged in a substantially symmetrical diode layout;
    a heightened plateau section area; and
    wherein at least one diode is a negative diode adjacent to a corresponding hole for a B+ stud.

10. A heat sink for a bridge rectifier comprising:
    a plurality of diodes arranged in a substantially symmetrical diode layout;
    radial air grooves disposed on the top surface of a base section of said heat sink to maximize convection surface area and allow for radial airflow on said surface; and
    wherein at least one diode is a negative diode adjacent to a corresponding hole for a B+ stud.

11. A heat sink for a bridge rectifier according to claim 10 further comprising dome-shaped holes to accommodate a first polarity set of diodes into a base section of said heat sink, without impeding on the grooved convection area.

12. A connection cover for a bridge rectifier comprising:
    a top face;
    filleted bottom inner and outer edges to facilitate and create airflow over a top surface of a base section of a heat sink; and
    a heightened radial rim over the outer edge of the top face of said connection cover, to block airflow over said top face, thus facilitating cooling airflow between the connection cover and the top face of the base section of said second heat sink.

* * * * *